US012046958B2

(12) United States Patent
Gallagher et al.

(10) Patent No.: US 12,046,958 B2
(45) Date of Patent: Jul. 23, 2024

(54) REMOTE CONTROLLED POWER UNIT

(71) Applicant: MILWAUKEE ELECTRIC TOOL CORPORATION, Brookfield, WI (US)

(72) Inventors: Patrick Dennis Gallagher, Oak Creek, WI (US); Timothy James Bartlett, Waukesha, WI (US); Alex Huber, Menomonee Falls, WI (US); William F. Chapman, III, Delevan, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 150 days.

(21) Appl. No.: 17/126,453

(22) Filed: Dec. 18, 2020

(65) Prior Publication Data

US 2021/0194332 A1   Jun. 24, 2021

Related U.S. Application Data

(60) Provisional application No. 62/952,970, filed on Dec. 23, 2019.

(51) Int. Cl.
*H02K 11/35* (2016.01)
*F04B 17/03* (2006.01)
(Continued)

(52) U.S. Cl.
CPC .............. *H02K 11/35* (2016.01); *F04B 17/03* (2013.01); *H02K 11/0094* (2013.01); *H02K 11/33* (2016.01); *H02K 21/16* (2013.01)

(58) Field of Classification Search
CPC .... H02K 11/35; H02K 11/03; H02K 11/0094; H02K 21/16; F04B 17/03
See application file for complete search history.

(56) References Cited

U.S. PATENT DOCUMENTS 5,149,225 A   9/1992  Artzberger
5,387,052 A   2/1995  Artzberger
(Continued)

FOREIGN PATENT DOCUMENTS

CN   205188931 U   4/2016
EP    3051658 B1   3/2018
(Continued)

OTHER PUBLICATIONS

International Search Report and Written Opinion for Application No. PCT/US2020/065879 dated Apr. 14, 2021 (9 pages).
(Continued)

*Primary Examiner* — Zoheb S Imtiaz
(74) *Attorney, Agent, or Firm* — Michael Best & Friedrich LLP

(57) ABSTRACT

One embodiment provides a remotely controllable gas engine replacement device including a housing, a battery receptacle coupled to the housing, the battery receptacle configured to removably receive a battery pack, a motor located within the housing, a power take-off shaft receiving torque from the motor and protruding from a side of the housing, a power switching network configured to selectively provide power from the battery pack to the motor, and one or more remote control device interfaces configured to communicate with the remote control device. The remotely controllable gas engine replacement device also includes an electronic processor coupled to the power switching network and the remote control device interface. The electronic processor configured to control the power switching network to rotate the motor, receive a control signal from the remote control device, and execute a responsive action to the control signal from the remote control device.

20 Claims, 12 Drawing Sheets

(51) Int. Cl.
*H02K 11/00* (2016.01)
*H02K 11/33* (2016.01)
*H02K 21/16* (2006.01)

(56) References Cited

U.S. PATENT DOCUMENTS

| | | | |
|---|---|---|---|
| 9,154,009 B2 | 10/2015 | Alemu | |
| 10,181,774 B2* | 1/2019 | Waikar | H01Q 7/00 |
| 10,840,777 B2* | 11/2020 | Coonrod | H02K 11/20 |
| 2013/0015825 A1* | 1/2013 | Pullen | H02K 7/025 |
| | | | 310/156.04 |
| 2014/0367134 A1 | 12/2014 | Phillips et al. | |
| 2018/0138839 A1* | 5/2018 | Puzio | H02K 11/28 |
| 2019/0006980 A1 | 1/2019 | Sheeks et al. | |
| 2019/0238083 A1 | 8/2019 | White et al. | |
| 2019/0258797 A1 | 8/2019 | Horie et al. | |
| 2019/0259984 A1* | 8/2019 | Nishikawa | H01M 50/213 |
| 2019/0263015 A1 | 8/2019 | Huber et al. | |
| 2019/0263363 A1 | 8/2019 | McIntyre et al. | |
| 2020/0001446 A1 | 1/2020 | Ballard et al. | |
| 2020/0076337 A1 | 3/2020 | Abbott et al. | |
| 2021/0328446 A1* | 10/2021 | Kuter-Arnebeck | H02J 7/00711 |
| 2022/0354052 A1* | 11/2022 | Jefferies | H02K 7/116 |

FOREIGN PATENT DOCUMENTS

| | | |
|---|---|---|
| EP | 3322086 A2 | 5/2018 |
| JP | 2018502727 | 2/2018 |

OTHER PUBLICATIONS

Extended European Search Report for Application No. 20908087.8 dated Oct. 24, 2023 (11 pages).

* cited by examiner

REMOTE CONTROLLED POWER UNIT

RELATED APPLICATIONS

This application claims the benefit of U.S. Provisional Patent Application No. 62/952,970, filed on Dec. 23, 2019, the entire content of which is hereby incorporated by reference.

FIELD

The present application relates to a gas engine replacement device and, more particularly, to remote control for recognizing and controlling a gas engine replacement device.

BACKGROUND

Small, single or multi-cylinder gasoline engines can be mounted to power equipment to drive the equipment with a power take-off shaft.

SUMMARY

Embodiments described herein provide a remotely controllable gas engine replacement device including a housing, a battery receptacle coupled to the housing, the battery receptacle configured to removably receive a battery pack, a motor located within the housing, a power take-off shaft receiving torque from the motor and protruding from a side of the housing, a power switching network configured to selectively provide power from the battery pack to the motor, and one or more remote control device interfaces configured to communicate with the remote control device. The remotely controllable gas engine replacement device also includes an electronic processor coupled to the power switching network and the remote control device interface. The electronic processor configured to control the power switching network to rotate the motor, receive a control signal from the remote control device, and execute a responsive action to the control signal from the remote control device.

In some embodiments, the remotely controllable gas engine replacement device includes an electrical interface supported on the housing for providing charge from the battery pack to a battery of the remote control device.

In some embodiments, the remotely controllable gas engine replacement device includes a wireless receiver, where the one or more remote control device interfaces configured to communicate with the remote control device include a wireless interface. The control signal received by the electronic processor from the remote control device is received via the wireless interface and the wireless receiver.

In some embodiments, the one or more remote control device interfaces configured to communicate with the remote control device include a wire line interface configured to receive a cable connected to the remote control device. The control signal received by the electronic processor from the remote control device is received via the wire line interface and the cable connected to the remote control device.

In some embodiments, the wire line interface configured to receive a cable connected to the remote control device includes media for providing power from the battery to the remote control device.

In some embodiments, the remotely controllable gas engine replacement device includes a reel for spooling the cable, wherein the cable is retractable onto the reel.

In some embodiments, the control signal received by the electronic processor from the remote control device includes a command for at least one of turning the motor on, turning the motor off, controlling a speed of the motor, or controlling a forward or reverse direction of the motor.

In some embodiments, the remotely controllable gas engine replacement device includes a light, wherein the control signal received by the electronic processor from the remote control device includes a command for turning the light on or off.

In some embodiments, the electronic processor is further configured to transmit information to the remote control device via the remote control device interface for indicating in a user interface of the remote control device. The information includes at least one of a level of charge of the battery pack, time remaining for use of the battery pack, a work cycle applied to the motor, a speed of the power take-off shaft, torque applied to the motor, or efficiency of the motor.

In some embodiments, the electronic processor is further configured to transmit to the remote control device one or both of an identity of specified power equipment attached to and driven by the gas replacement engine for configuring the remote control device for use with the specified power equipment, and parameters for configuring the remote control device for use with the specified power equipment.

Embodiments described herein provide a method for remotely controlling a gas engine replacement device. The method includes controlling, by an electronic processor, a power switching network to rotate a motor. The power switching network is configured to selectively provide power from a battery pack to the motor. The battery pack is removably received by a battery receptacle coupled to the housing. The motor provides torque to a power take-off shaft protruding from a side of the housing. The electronic processor receives a control signal from the remote control device, and executes a responsive action to the control signal from the remote control device to control the gas engine replacement device.

Embodiments described herein provide a remote control device for controlling a gas engine replacement device. The remote control device includes a housing, one or more communication interfaces configured to communicate with the gas engine replacement device. The gas engine replacement engine device includes a power switching network to rotate a motor. The power switching network is configured to selectively provide power from a battery pack of the gas engine replacement device to the motor. The motor provides torque to a power take-off shaft. The remote control device for controlling a gas engine replacement device also includes one or more user interfaces and an electronic processor. The electronic processor is coupled to the one or more communication interfaces and the one or more user interfaces. The electronic processor is configured to receive input via the one or more user interfaces and transmit a control signal to the gas engine replacement device via the one or more communication interfaces for execution of a responsive action to the control signal by the gas engine replacement device based on the received input.

In some embodiments, the remote control device also includes a battery receptacle supported by the housing. The battery receptacle is configured to removably receive a battery pack.

In some embodiments, the remote control device of claim 13 includes one or more electrical interfaces supported by the housing for receiving power to charge the battery pack. The power is received from the gas engine replacement device or from a separate power source.

In some embodiments, the one or more communication interfaces configured to communicate with the gas engine replacement device includes a wireless interface. The control signal transmitted to the gas engine replacement device via the one or more communication interfaces for execution of a responsive action to the control signal by the gas engine replacement device is transmitted via the wireless interface.

In some embodiments, the one or more communication interfaces configured to communicate with the gas engine replacement device includes a wire line interface configured to receive a cable connected to the gas engine replacement device. The control signal transmitted to the gas engine replacement device via the one or more communication interfaces for execution of a responsive action to the control signal by the gas engine replacement device is transmitted via the wire line interface and the cable.

In some embodiments, the wire line interface receives media of the cable that delivers power to the remote control device from the gas engine replacement device.

In some embodiments, the one or more user interfaces includes at least one of an LED indicator, a display device, an interactive display device, and a physical actuatable input mechanism.

In some embodiments, the one or more user interfaces includes user actuatable components for the receiving of the input. The user actuatable components include at least one of an on and off control for activating or deactivating the motor of the gas engine replacement device, a motor speed variation control for varying the speed of the motor of the gas engine replacement device, a communication pairing control for pairing the remote control device with the gas engine replacement device for communication via the one or more communications interfaces, an on and off control for activating or deactivating a light of the gas engine replacement device, and a motor forward and motor reverse control for changing the direction of the rotation of the motor.

In some embodiments, the one or more user interfaces includes user actuatable components for switching the remote control device to turn on or turn off and switching the remote control device between communication with the gas replacement engine device via a wireless interface or via a wire line interface of the one or more communication interfaces.

In some embodiments, the one or more user interfaces is configured to indicate one or more of a level of charge of the battery pack, time remaining for use of the battery pack, a work cycle applied to the motor, a speed of the power take-off shaft, torque applied to the motor, or efficiency of the motor.

In some embodiments, the electronic processor is configured to receive from the gas engine replacement device one or both of an identity of specified power equipment attached to and driven by the gas replacement engine, and parameters for configuring the remote control device. The electronic processor controls the one or more user interfaces for use with the specified power equipment based on the identity of the specified power equipment or the parameters for configuring the remote control device.

Embodiments described herein provide a method for controlling a gas engine replacement device with a remote control device. The method includes receiving, by an electronic processor, input via one or more user interfaces of the remote control device, and transmitting a control signal to the gas engine replacement device via one or more communication interfaces of the remote control device for execution of a responsive action to the control signal by the gas engine replacement device. The gas engine replacement engine includes a power switching network to rotate a motor of the gas engine replacement device for driving power equipment. The power switching network is configured to selectively provide power from a battery pack of the gas engine replacement device to the motor. The motor provides torque to a power take-off shaft.

In some embodiments, the method includes removably receiving a battery pack in a battery receptacle supported by the housing of the remote control device.

In some embodiments, the method includes receiving, from the gas engine replacement device or from a separate power source, via one or more electrical interfaces supported by the housing of the remote control device, power to charge the battery pack of the remote control device.

In some embodiments, the one or more communication interfaces includes a wireless interface, and the control signal transmitted to the gas engine replacement device via the one or more communication interfaces for execution of a responsive action to the control signal by the gas engine replacement device is transmitted via the wireless interface.

In some embodiments, the one or more communication interfaces includes a wire line interface configured to receive a cable connected to the gas engine replacement device, and the control signal transmitted to the gas engine replacement device via the one or more communication interfaces for execution of a responsive action to the control signal by the gas engine replacement device is transmitted via the wire line interface and the cable.

In some embodiments, the method includes receiving power from the gas engine replacement device via the wire line interface, where the wire line interface receives media of the cable that delivers power to the remote control device from the gas engine replacement device.

In some embodiments, the one or more user interfaces includes at least one of an LED indicator, a display device, an interactive display device, and a physical actuatable input mechanism.

In some embodiments, the one or more user interfaces includes user actuatable components for the receiving of the input. The user actuatable components include at least one of an on and off control for activating or deactivating the motor of the gas engine replacement device, a motor speed variation control for varying the speed of the motor of the gas engine replacement device, a communication pairing control for pairing the remote control device with the gas engine replacement device for communication via the one or more communications interfaces, an on and off control for activating or deactivating a light of the gas engine replacement device, and a motor forward and motor reverse control for changing the direction of the rotation of the motor.

In some embodiments, the one or more user interfaces includes user actuatable components for switching the remote control device to turn on or turn off and switching the remote control device between communication with the gas replacement engine device via a wireless interface or via a wire line interface of the one or more communication interfaces.

In some embodiments, the one or more user interfaces is configured to indicate one or more of a level of charge of the battery pack, time remaining for use of the battery pack, a work cycle applied to the motor, a speed of the power take-off shaft, torque applied to the motor, or efficiency of the motor.

In some embodiments, the method includes receiving from the gas engine replacement device one or both of an identity of specified power equipment attached to and driven by the gas replacement engine, and parameters for configuring the remote control device. The method further includes controlling the one or more user interfaces for use with the specified power equipment based on the identity of the specified power equipment or the parameters for configuring the remote control device.

Other features and aspects will become apparent by consideration of the following detailed description and accompanying drawings.

DETAILED DESCRIPTION

Figure 1:
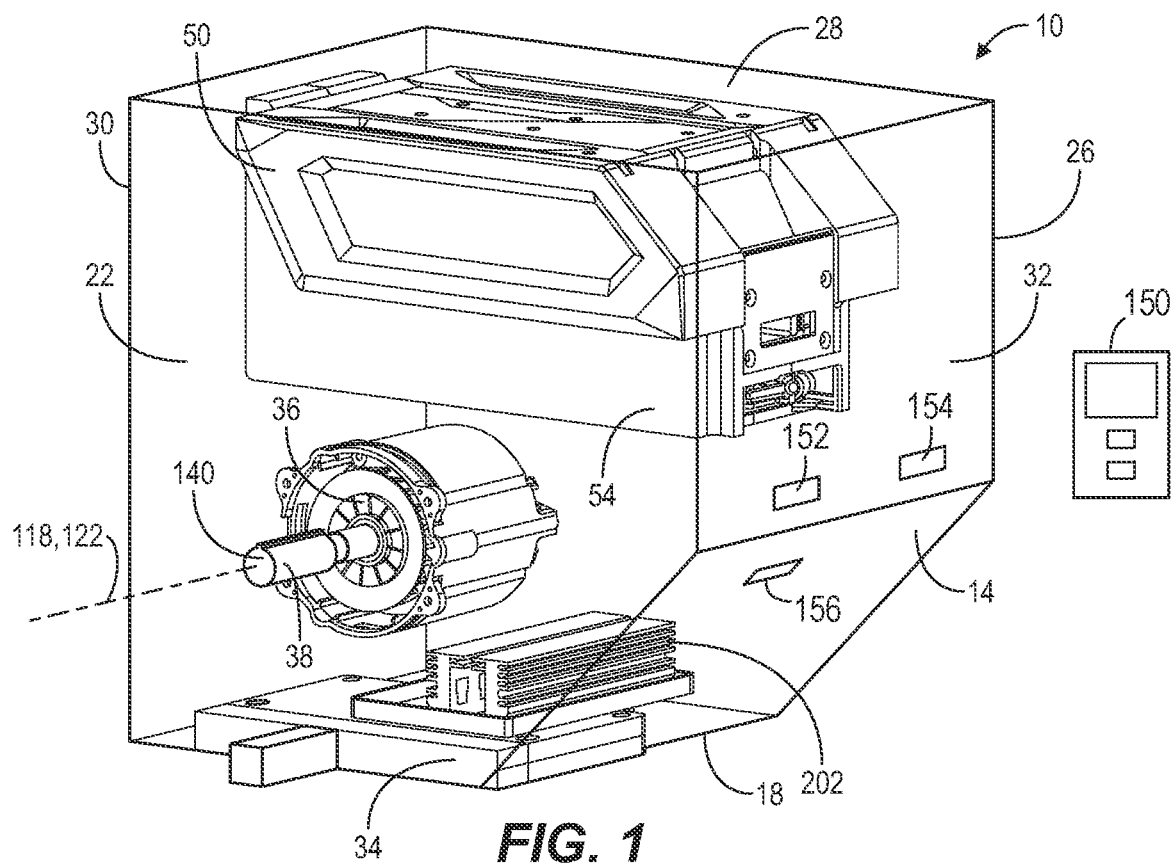
FIG. 1 is a perspective view of a gas engine replacement device, according to some embodiments.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Figure 2:
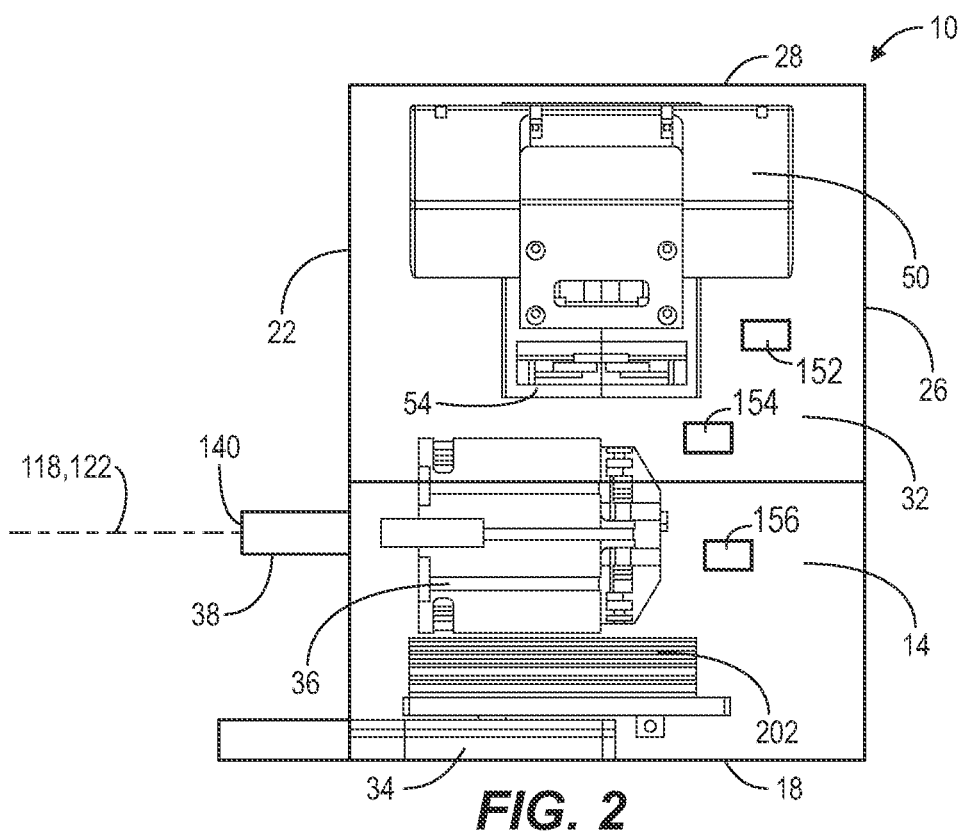
FIG. 2 is a plan view of the gas engine replacement device of FIG. 1, according to some embodiments.
Figure 3:
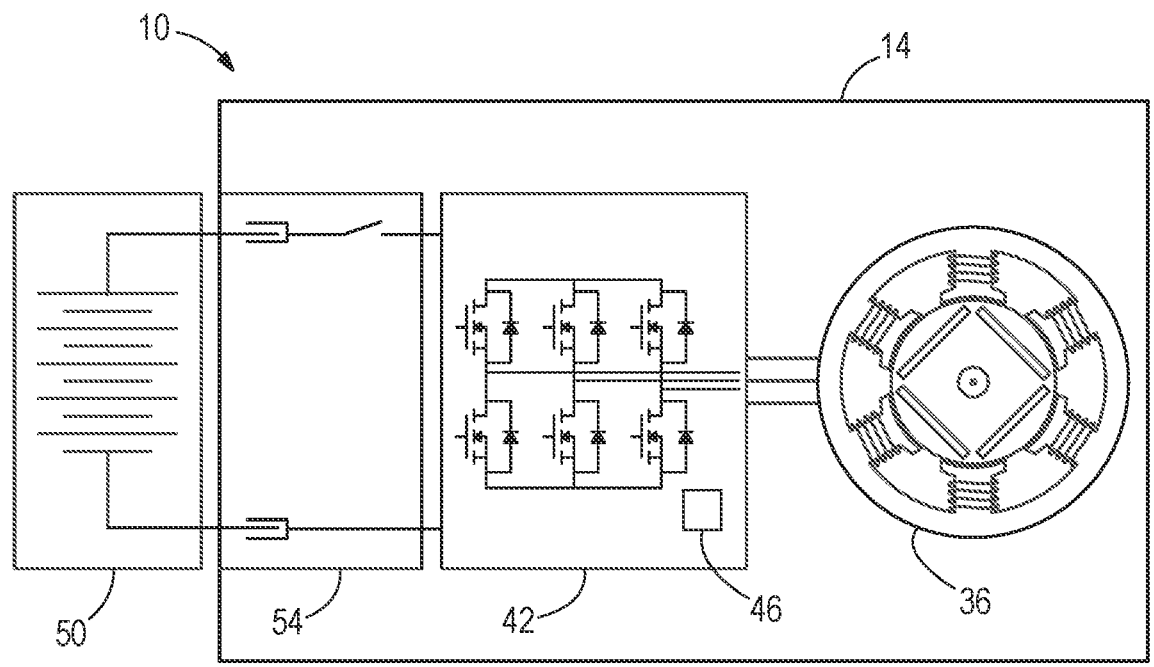
FIG. 3 is a schematic view of the gas engine replacement device of FIG. 1, according to some embodiments.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference.

Figure 4:
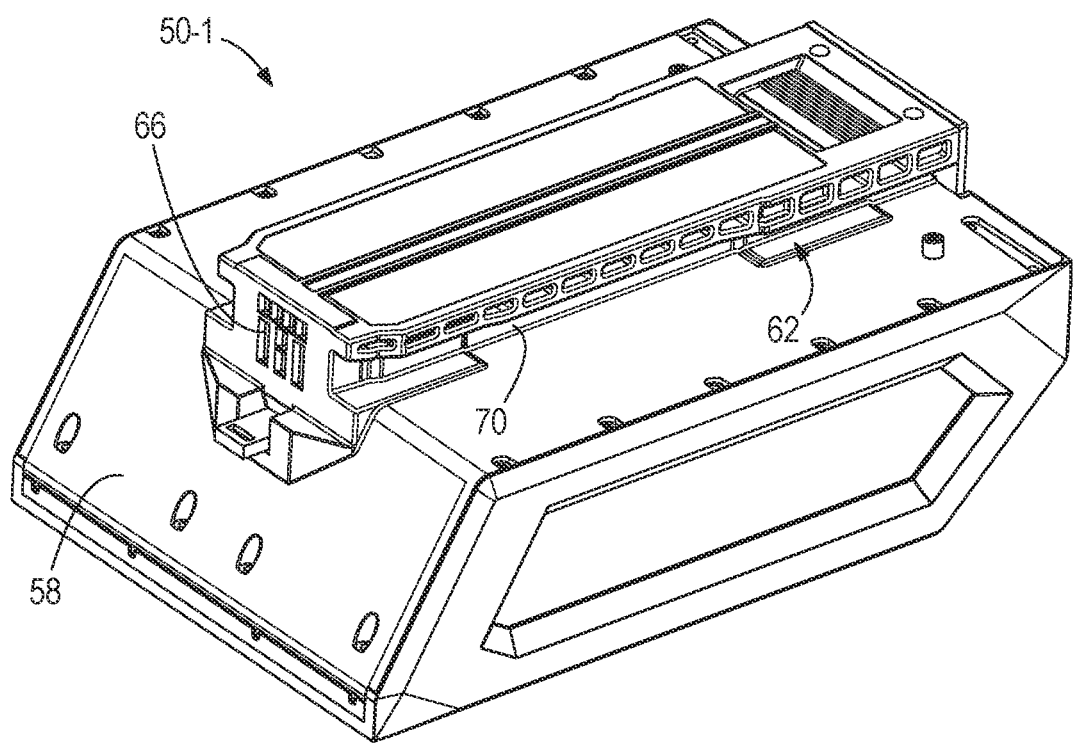
FIG. 4 is a perspective view of a battery pack of the gas engine replacement device of FIG. 1, according to some embodiments.
Figure 5:
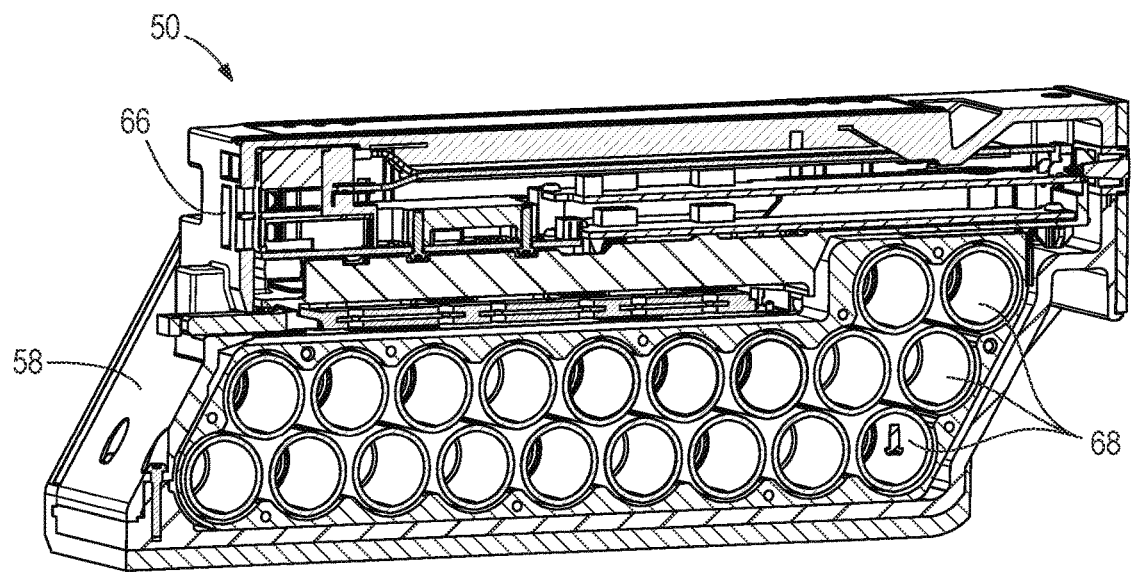
FIG. 5 is a cross-sectional view of the battery pack of FIG. 4, according to some embodiments.
Figure 6:
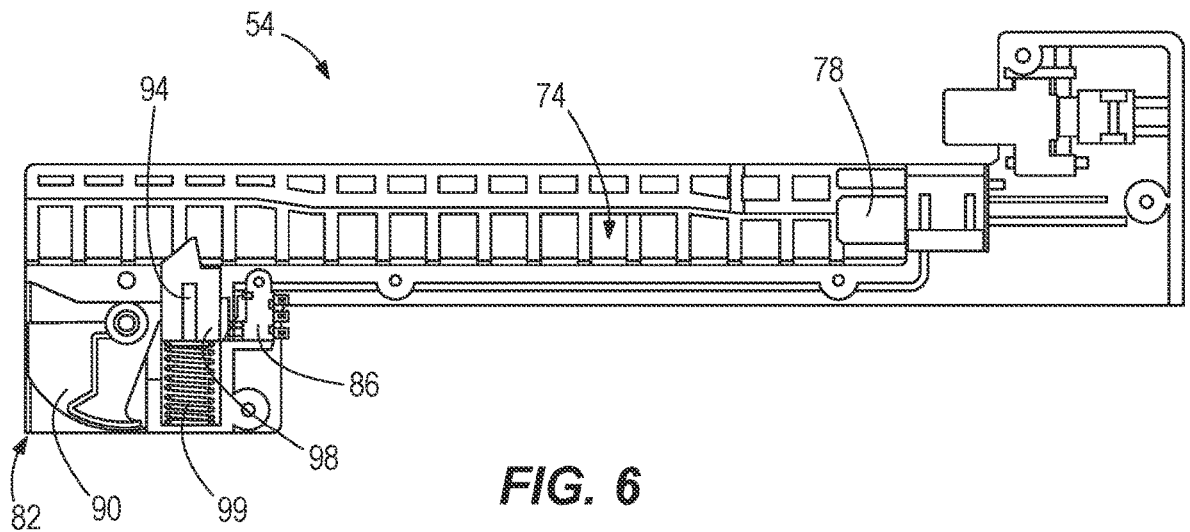
FIG. 6 is a cross-sectional view of a battery receptacle of the gas engine replacement device of FIG. 1, according to some embodiments.

As shown in FIGS. 1-6, the gas engine replacement device 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. Patent Publication No. 2019/0006980 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

As shown in FIGS. 1, 2, and 9-15, the a gas engine replacement device 10 includes one or more remote control device interfaces 152 supported on the housing 14 for communication with a remote control device 150. The one or more remote control interfaces 152 may include a wireless interface 152 and/or a wire line interface 152. The wire line interface 152 may be configured to receive a cable 1024 (FIG. 10) that is configured to connect to the remote control device 150. In some embodiments, the gas engine replacement device 10 includes one or more accessories 154. For example, an accessory 154 of the gas engine replacement engine may include a cord retract reel 154 such that the cable 1024 connected to the remote control device 150 may retract onto the cord retract reel 154 for easy storage. In some embodiments, the gas engine replacement device 10 includes an electrical interface 154 that is supported on the housing 14. In some embodiments, the accessory 154 includes a work light that receives power from the battery pack 50 and can be activated by the remote control device 150 or a switch on the gas replacement engine device 10. The electrical interface 156 is configured to provide an electrical connection and mechanical support to receive the remote control device 150 or a cable from the remote control device for providing power from the battery pack 50 to the remote control device 150 for powering the remote control device 150 and/or for charging a battery 1014 (see FIG. 10) of the remote control device 150.

FIG. 6 illustrates the battery receptacle 54 of the gas engine replacement device 10 in accordance with some embodiments. The battery receptacle 54 includes the projection/recess 74, a second terminal 78, a latching mechanism 82, and a power disconnect switch 86. The projection/recess 74 cooperates with the projection/recess 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the receptacle 54 and is biased toward a latching position by a biasing member 102 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
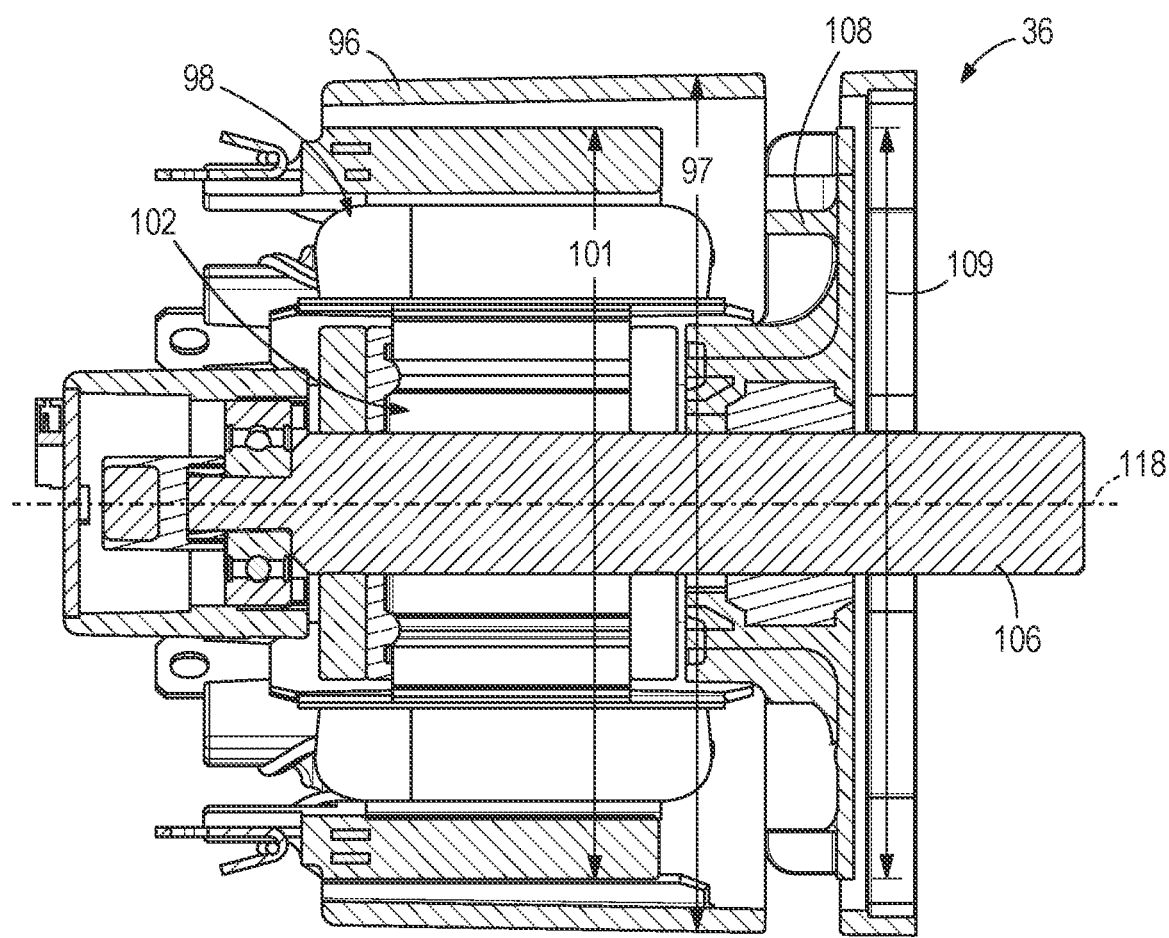
FIG. 7 is a cross-sectional view of a motor of the gas engine replacement device of FIG. 1, according to some embodiments.

As shown in FIG. 7, the motor 36 includes a motor housing 96 having an outer diameter 97, a stator 98 having a nominal outer diameter 102 of up to about 80 mm, a rotor 102 having an output shaft 106 and supported for rotation within the stator 98, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm.

Figure 8:
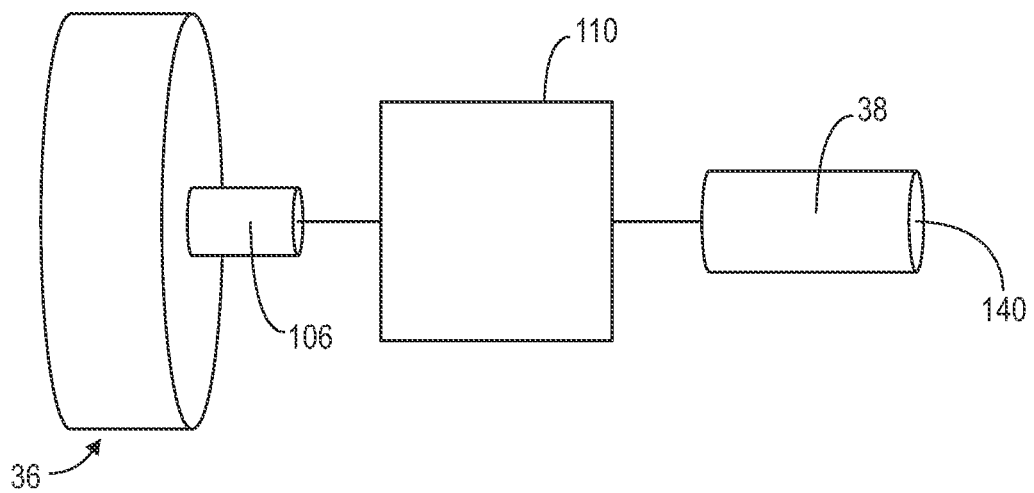
FIG. 8 is a schematic view of a motor, a gear train, and a power take-off shaft of the gas engine replacement device of FIG. 1, according to some embodiments.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 102 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding. The gas engine replacement device 10 may be configured to be attached to and drive various types of power equipment, for example, and without limitation, a compactor, a rammer, a jetter, a cement mixer, a sprayer (e.g., an agricultural sprayer), and a pump system.

In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

|  | Metal | Plastic/ Rubber/Wood | Porcelain/ Vitreous |
|---|---|---|---|
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

|  | Metal | Plastic/Rubber |
|---|---|---|
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 9:
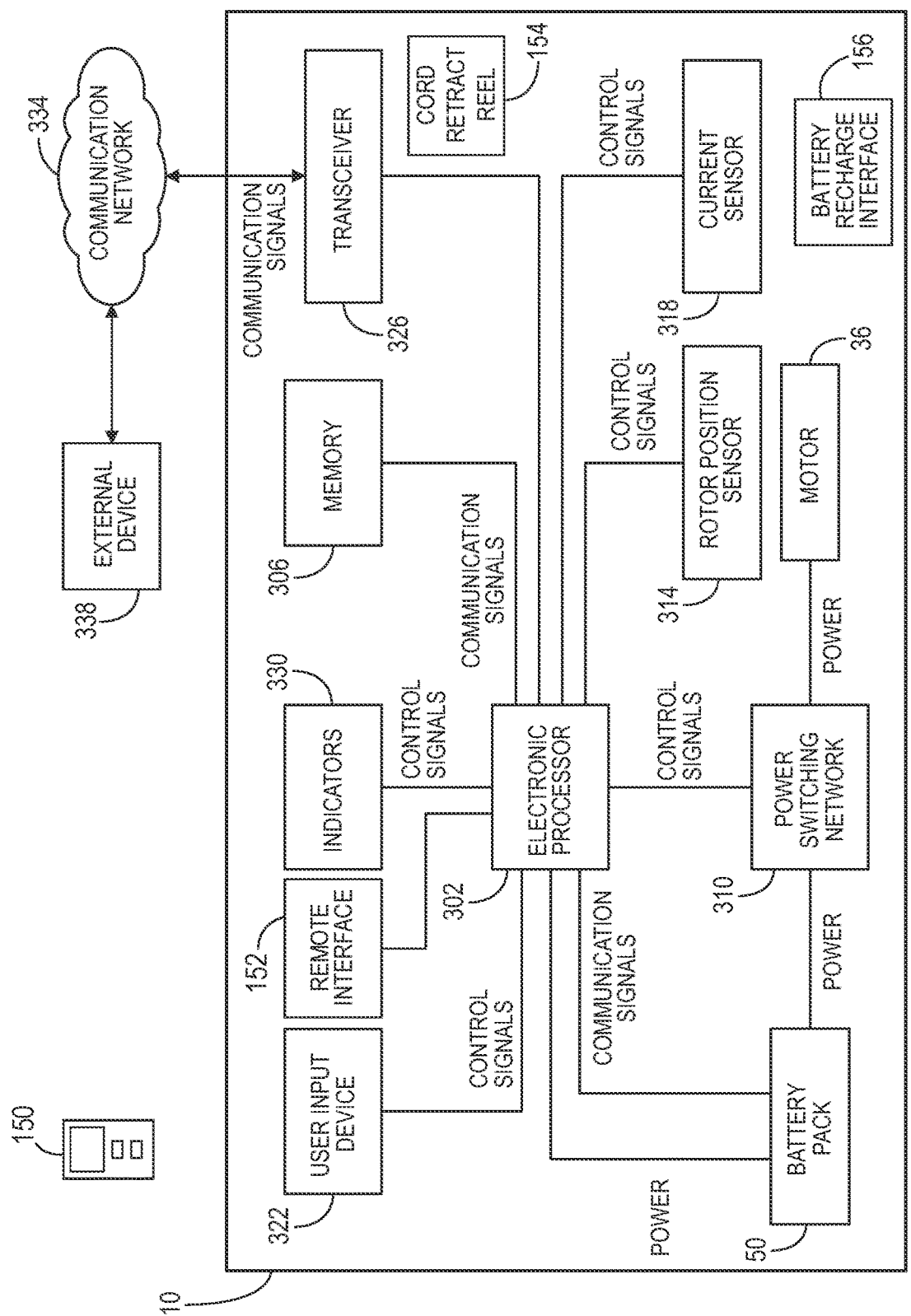
FIG. 9 is a schematic view of the gas engine replacement device of FIG. 1 configured to operate based on communications with a remote control device, according to some embodiments.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a current sensor 318, a user input device 322 (e.g., a trigger or power button), a transceiver 326, indicators 330 (e.g., light-emitting diodes), and a communications manager 340. In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, user input device 322 (e.g., a trigger or power button), transceiver 326, and indicators 330 (e.g., light-emitting diodes) form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In some embodiments, the user input device 322 may be a forward/reverse switch actuated by a user or a mode selection switch that allows the user to select a mode of operation. The user input device 322 provides a control signal to the electronic processor 302 to switch the direction of rotation of the motor 36 based on the actuation of the user input device 322. In some embodiments, the input may be received from one or more sensors of the gas engine replacement device 10 or a power equipment coupled to the gas engine replacement device 10. In some embodiments, the input may be received from, for example, a smart phone through the communication network 334.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device 338 (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302.

The communication network 334 provides a wired or wireless connection between the gas engine replacement device 10 and the external device 338. The communication network 334 may comprise a short range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

Also shown in FIG. 9 are the remote control device 150 and the one or more remote control device interfaces 152. The one or more remote control device interfaces 152 are coupled to the electronic processor 302. The electronic processor 302 may be configured to receive signals from the remote control device 150 and generate commands for controlling the gas engine replacement device 10 based on information or commands included in the signals received from the remote control device 150. The commands may configure the electronic processor 302 to initiate execution of a running state of the gas engine replacement device 10, control speed of the motor 36, control a work light connected to the gas engine replacement device 10, or control the direction of rotation of the motor 36, for example. The one or more remote control device interfaces 152 may include a wireless interface 152 and/or a wire line interface 152 that are configured for receiving information from and/or communicating information to the remote control device 150. In some embodiments, the user input device 322 may include an actuatable component for switching a configuration of the gas replacement engine device 10 between wireless and wire line communication modes (see also FIGS. 12A and 12B).

In some embodiments, a wireless interface 152 may include a wireless receiver and/or transmitter and is configured to communicate with the remote device 150 using one or more wide area, local area, or personal area wireless technologies including Bluetooth Low-Energy, Bluetooth, 433 MHz, WiFi, infrared, and cellular (e.g., 2G, 3G, 4G, 5G, and LTE), etc. The electronic processor 302 may be configured to communicatively pair with the remote control device 150, for example, to discover and identify the remote control 150 based on user input at the gas engine replacement device 10 user input device 322 and/or at the user interface 1018 of the remote control device 150. In some embodiments, the electronic processor 302 communicates with the remote control 150 via the transceiver 326. The remote interface 152 may communicate with the electronic processor 302 via a communications link, for example, using UART, SPI, RS485, and/or signals that designate a running state.

A wire line interface 152 may be configured for communicating information and/or data with the gas engine replacement device 10 via the cable 1024 (FIG. 10) connected between the remote control device 150 and the gas engine replacement device 10. In some embodiments, the wire line interface 152 may be configured for communicating data and for providing electrical energy from the battery pack 50 to the remote control device 150. Also shown in FIG. 9 is the accessory 154, such as the cord retract reel for retracting the cable 1024 into or onto the gas engine replacement device 10, or a working light. Also shown in FIG. 9 is the electrical interface 156 that is coupled to the battery pack 50 and configured to provide an electrical connection and mechanical support to receive the remote control device 150 or a cable from the remote control device 150 (e.g., a USB connector and cable). The electrical interface 156 is configured for providing power from the battery pack 50 to the remote control device 150 for charging a battery 1014 (see FIG. 10) of the remote control device 150 and/or for powering the remote control device 150.

The connections shown between components of the gas engine replacement device 10 are simplified in FIG. 9. In practice, the wiring of the gas engine replacement device 10 is more complex, as the components of a gas engine replacement device are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

Figure 10:
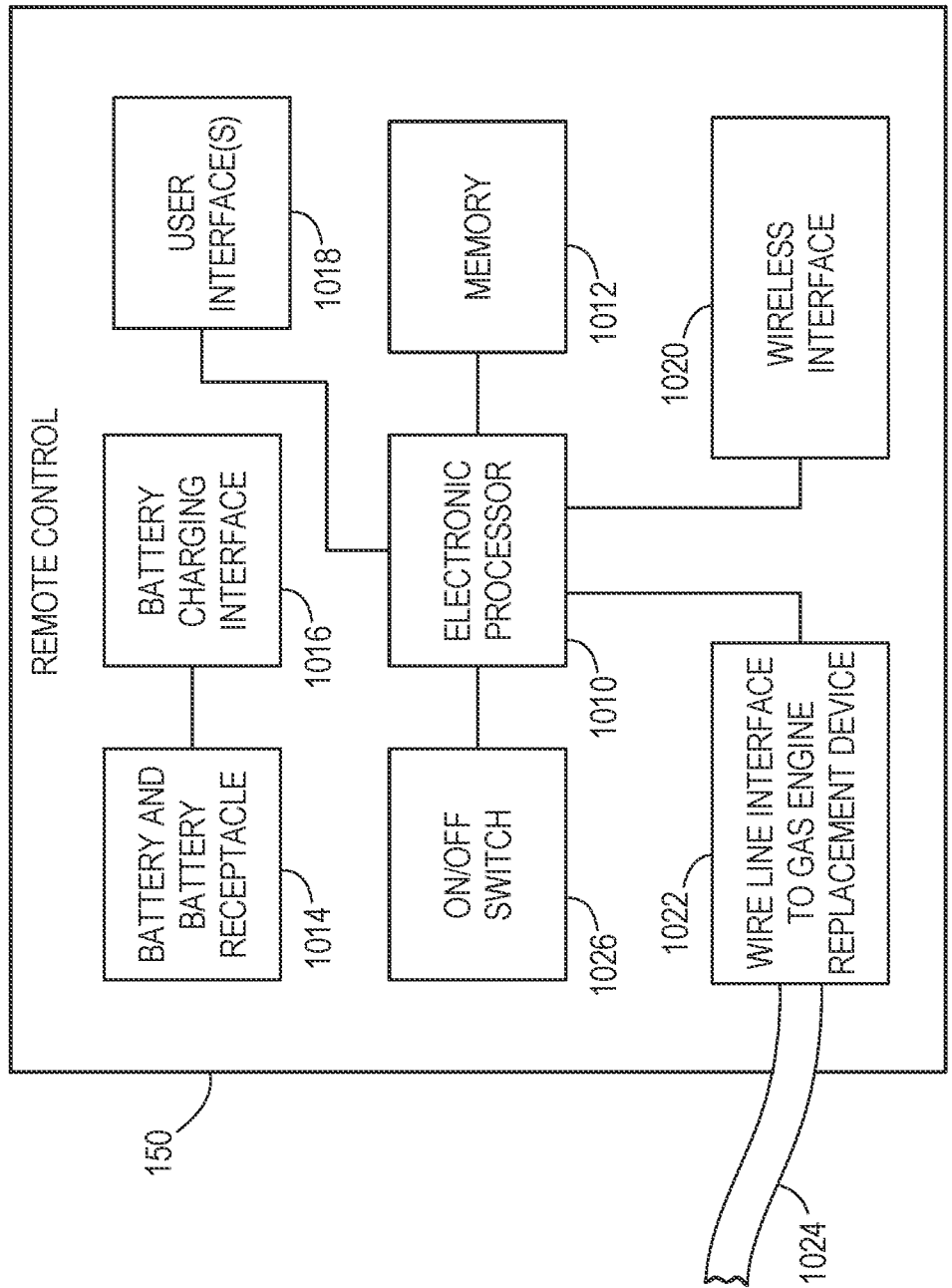
FIG. 10 is a schematic view of a remote control device for communicating and controlling the gas engine replacement device of FIG. 1, according to some embodiments.
Figure 11:
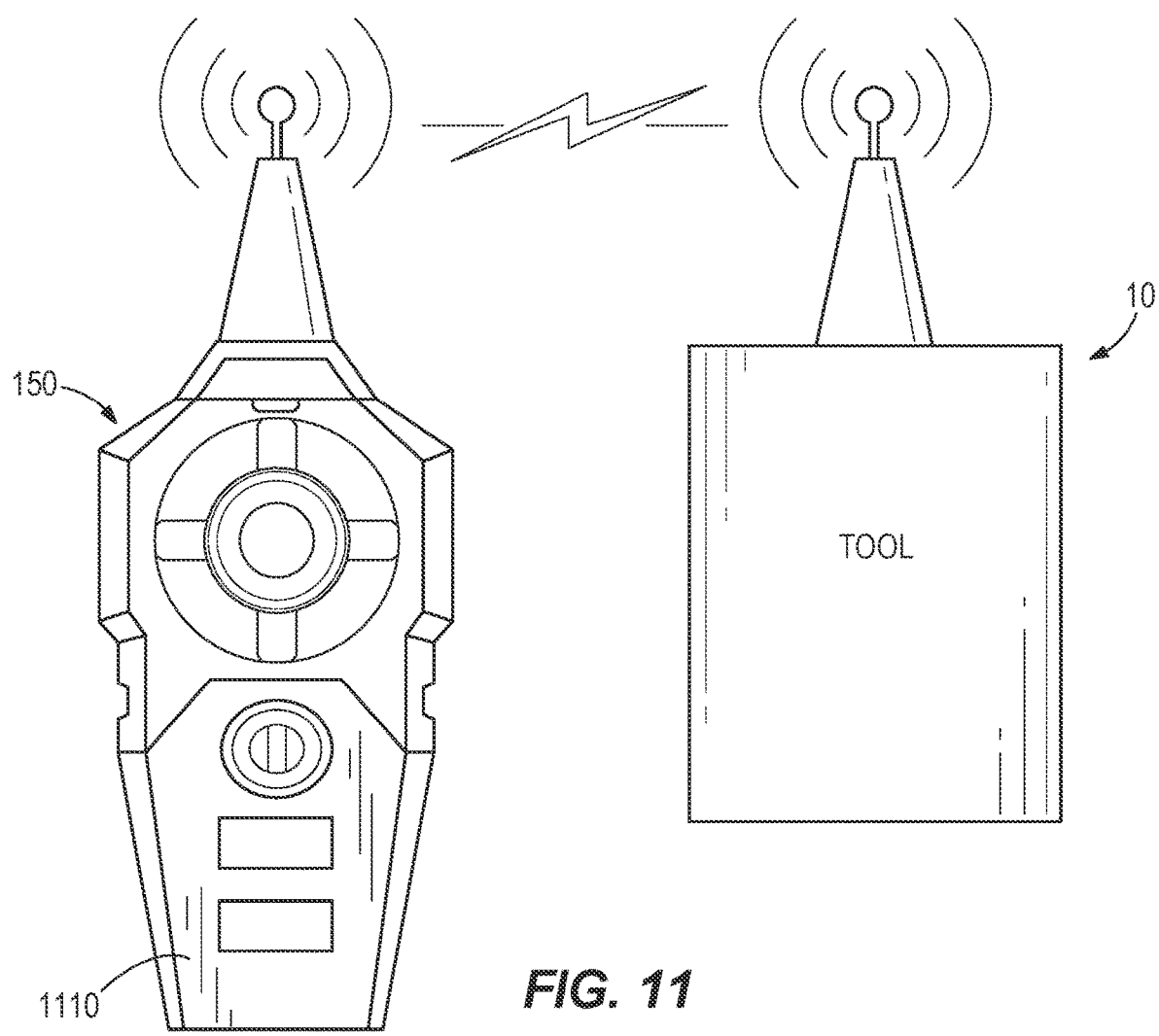
FIG. 11 is a diagram illustrating a remote control device in wireless communication with a gas engine replacement device of FIG. 1, according to some embodiments.
Figure 12A:
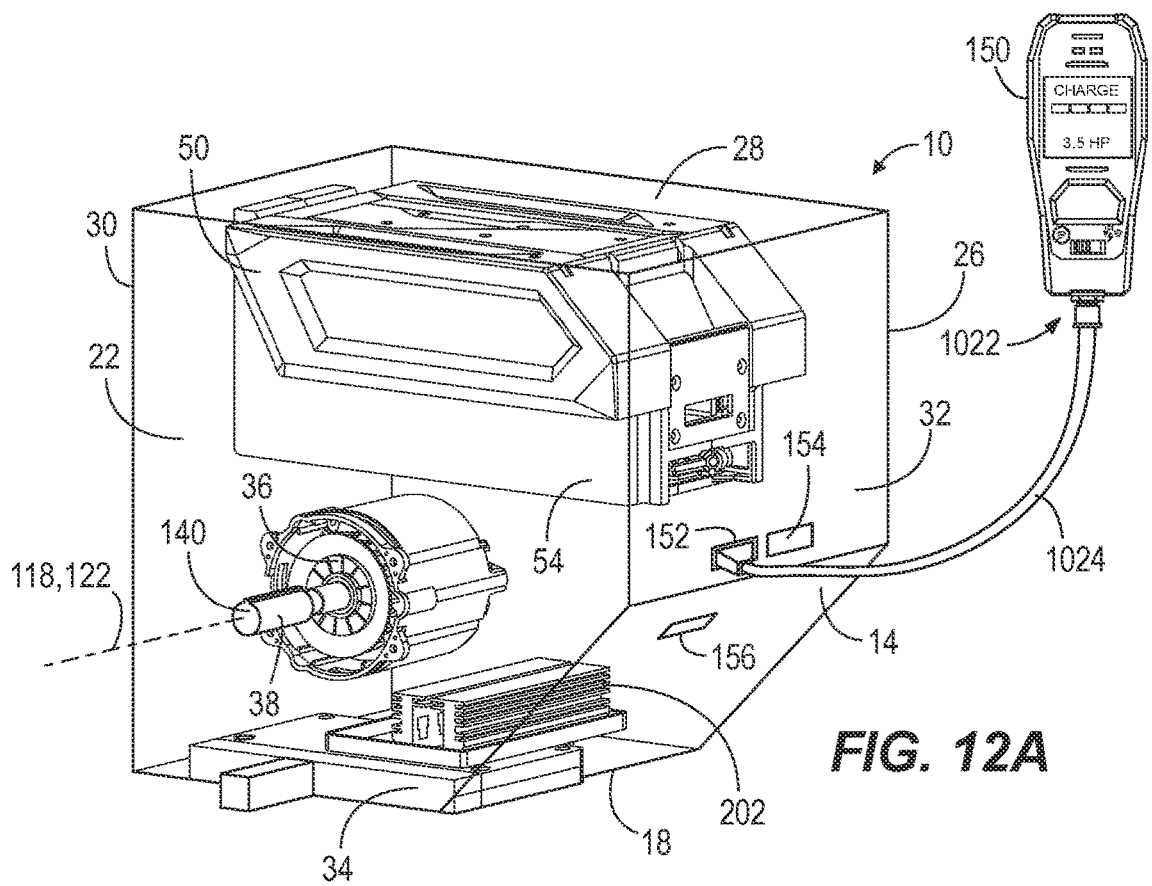
FIG. 12A illustrates a remote control device in communication with a gas engine replacement device of FIG. 1 via a wire line connection, according to some embodiments.
Figure 12B:
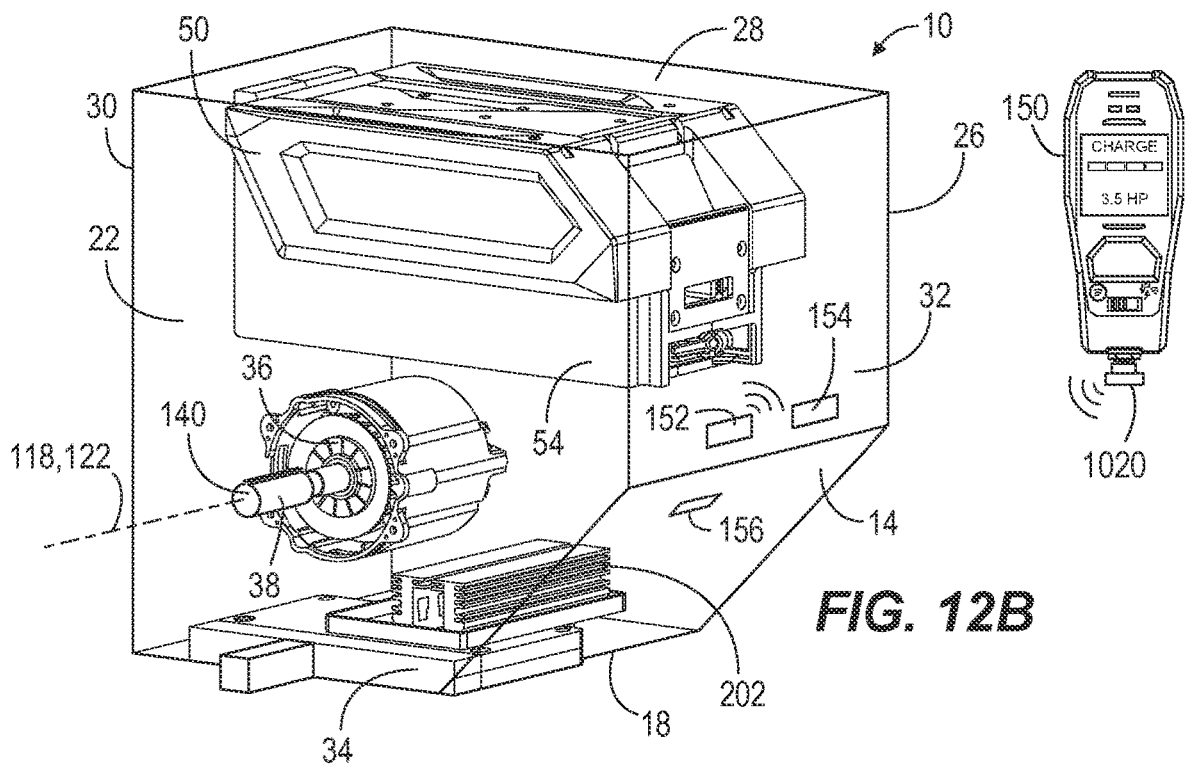
FIG. 12B illustrates a remote control device in communication with a gas engine replacement device of FIG. 1 via a wireless connection, according to some embodiments.
Figure 13B:
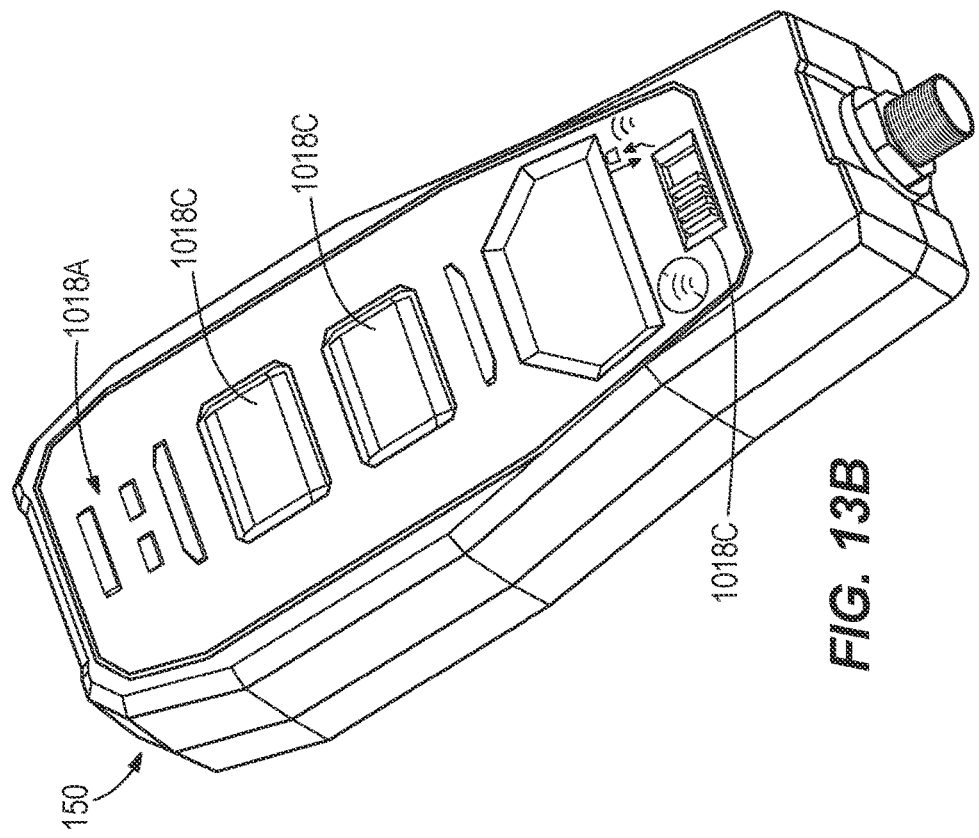
FIGS. 13A and 13B are diagrams illustrating user interfaces of a remote control device for controlling a gas engine replacement device of FIG. 1, according to some embodiments.
Figure 13A:
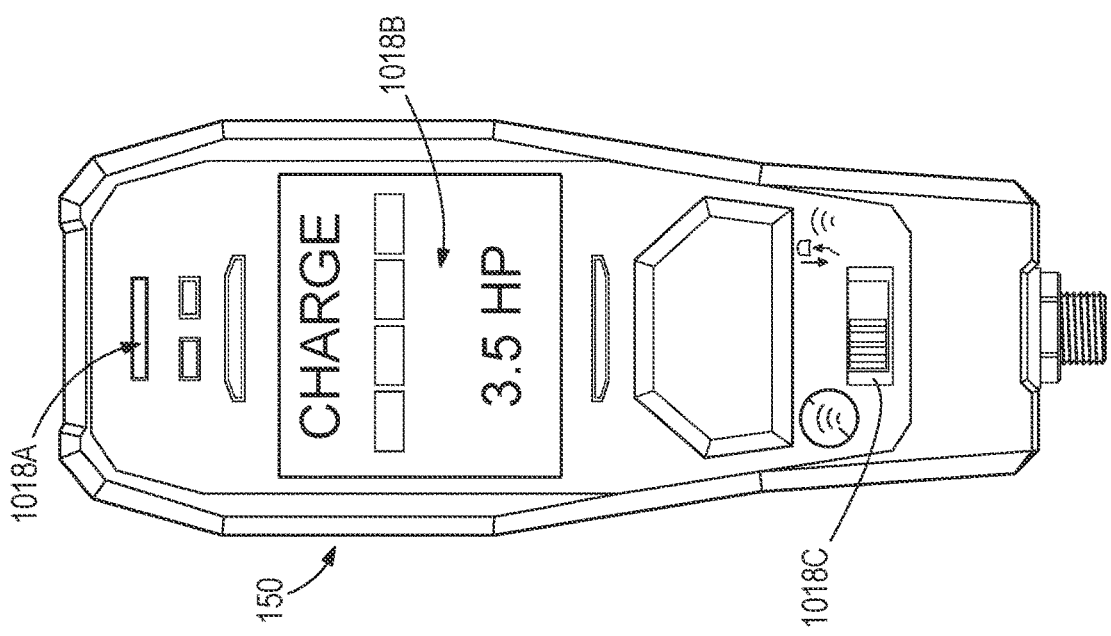

FIG. 10 is a schematic view of the remote control device 150 that is used for communicating and controlling the gas engine replacement device 10. FIG. 11 is a diagram illustrating the remote control device 150 in wireless communication with the gas engine replacement device 10. FIGS. 12A-12B are schematic views of the remote control device 150 in communication with the gas engine replacement device 10 via the wire line connection 1022 and cable 1024 (FIG. 12A), and the remote control device 150 in communication with the gas engine replacement device 10 via the wireless interface 1020 (FIG. 12B). FIGS. 13A and 13B are diagrams illustrating user interfaces 1018 of the remote control device 150 for controlling the gas engine replacement device 10.

Referring to FIGS. 10, 11, 12A-12B, and 13A-13B, the remote control device 150 includes an electronic processor 1010 and a memory 1012. The remote control also includes a battery receptacle 1014 for receiving a battery and a battery charging interface 1016. The remote control 150 also includes one or more user interfaces 1018, a wireless interface 1020, a wire line interface 1022, a cable for connecting the remote control device 150 to the gas engine replacement device 10, and a remote control device on/off switch 1026. In some embodiments, the remote control device 150 includes fewer or more components than those depicted in FIG. 10.

The electronic processor 1010 is coupled to one or more communication interfaces including the wireless interface 1020 and/or the wire line interface 1022. The electronic processor 1010 is configured to communicate with the gas engine replacement device 10 via the wireless interface 1020 and/or the wire line interface 1022. The wire line interface 1022 is configured to receive a cable 1024 that is configured to provide a connection between the remote control device 150 and the gas engine replacement device 10 via the remote interface 152. In some embodiments, the cable 1024 includes media that carries information such as data to and/or from the remote control device 150 (e.g., from and/or to the electronic controller 302 of the gas engine replacement device 10) and delivers power from the battery 50 to the remote control device 150 for running the remote control device 150. As noted above, the remote control 150 and the gas engine replacement device 10 may communicate wirelessly using one or more of wide area, local area, or personal area wireless technologies including Bluetooth Low-Energy, Bluetooth, 433 MHz, WiFi, infrared, and cellular (e.g., 2G, 3G, 4G, 5G, and LTE), etc. The electronic processor 1010 may be configured to communicatively pair with the gas engine replacement device 10, for example, to discover and identify the gas engine replacement device 10 based on user input at the user interface 1018 of the remote control device 150 and/or at the user input device 322 of the gas engine replacement device 10. In some embodiments, the electronic processor 1018 communicates with the gas engine replacement device 10 via the wireless interface 1020.

The electronic processor 1010 is coupled to one or more user interfaces 1018 and is configured to receive user input via the one or more user interfaces 1018. The electronic processor 1010 is configured generate a control signal based on user input received via the one or more user interfaces 1018 and transmit the control signal to the gas engine replacement device 10 via the wireless interface 1020 or the wire line interface 1022. The control signal may include a command and the electronic controller 302 of the gas engine replacement device 10 may execute a responsive action based on the control signal. For example, the electronic controller 302 may control the motor 36 or other components of the gas engine replacement device 10 based on the input received via the one or more user interfaces 1018.

The one or more user interface(s) 1018 may include a light emitting diode (LED) indicator 1018A or a series of LED indicators 1018A (see FIG. 13A) for communicating a status or operation state(s) of the gas engine replacement device 10 or the remote control device 150. The one or more user interface(s) 1018 may include any suitable display device 1018B (see FIG. 13A), for example, an LCD display or another type of display. The one or more remote interfaces 1018 may be configured to indicate a status or state of one or more components of the gas engine replacement device 10 or of the power equipment attached to and driven by the gas engine replacement device 10. For example, the one or more user interfaces may be configured to indicate one or more of a level of charge of the battery pack 50, time remaining for use of the battery pack 50, a work cycle applied to the motor 36, a speed of the motor 36 or the power take-off shaft 38, torque applied to the motor 36, or efficiency of the motor 36. In some embodiments, the one or more user interface(s) 1018 includes an interactive display device 1018B, for example, a touch screen display device that may display a graphical user interface and receive user selections for controlling the gas engine replacement device 10 via the touch screen display device 1018B. Moreover, in some embodiments, the one or more user interface(s) 1018 includes physical actuatable input mechanisms 1018C (see FIGS. 13A and 13B), such as buttons, knobs, dials, sliders, or switches for actuation by a user to initiate control of the gas engine replacement system 10 or the remote control 150. The information for display on the remote device 150 may be received by the remote device 150 from the electronic processor 302 via the remote interface 152.

The one or more user interfaces 1018 include user actuatable components for at least one of an on and off control for activating or deactivating the motor 36 of the gas engine replacement device 10, a motor speed variation control for varying the speed of the motor 36 of the gas engine replacement device 10, a communication pairing control for pairing the remote control device 150 with the gas engine replacement device 10 for communication via the one or more communications interfaces (e.g., 1020 and/or 1022), an on and off control for activating or deactivating an accessory 154, such as a work light 154 of the gas engine replacement device 10, and a control for selecting a forward or reverse rotation direction for the motor 36. In some embodiments, the one or more user interfaces 1018 include user actuatable components for switching the remote control device 150 to turn on or turn off, and/or switching the remote control device 105 between communication with the gas replacement engine device 10 via the wireless interface 1020 or via the wire line interface 1022 of the one or more communication interfaces.

The battery receptacle 1014 is supported by the housing 1110 (see FIG. 11) and is configured to receive a battery pack or a battery for providing power to the remote control device 150. In some embodiments, the remote control device 150 includes one or more electrical interface(s) 1016 that are supported by the housing 1110 and receive power to charge the battery pack that is received in the battery receptacle 1014, or to run the remote control device 150. In some embodiments, the electrical interface 1016 is configured to receive the battery recharge interface 156 of the gas engine replacement device 10 to receive power from the battery pack 50. In other embodiments, the electrical interface 1016 is configured to receive another type of electrical connector. For example, the electrical interface(s) 1016 may include a USB port for receiving power via a USB cable. In another example, the electrical interface(s) 1016 include an induction coil configured to receive energy transferred from a charging station or inductive pad (e.g., at the battery recharge interface 156) via an inductive coupling. In some embodiments, the battery or battery pack is removably received by the battery receptacle 1014 and may be removed and recharged in a separate battery charging device.

In some embodiments, components of the remote control device 150 may be configured for operation with the gas engine replacement engine 10 depending on the type of power equipment that is attached to and driven by the gas engine replacement device 10. For example, commands for controlling a pump system or for providing feedback on status or state of a pump system may be different than commands and feedback for a compactor system or a jetter system driven by the gas engine replacement system 10. The electronic processor 1010 may be configured to receive one or both of an identity of specified power equipment attached to and driven by the gas replacement engine, and parameters for configuring the remote control device. The electronic processor 1010 may be configured to control the one or more user interfaces 1018 for use with the specified power equipment based on the identity of the specified power equipment or the parameters for configuring the remote control device 150 received from the gas engine replacement device 10.

Figure 14:
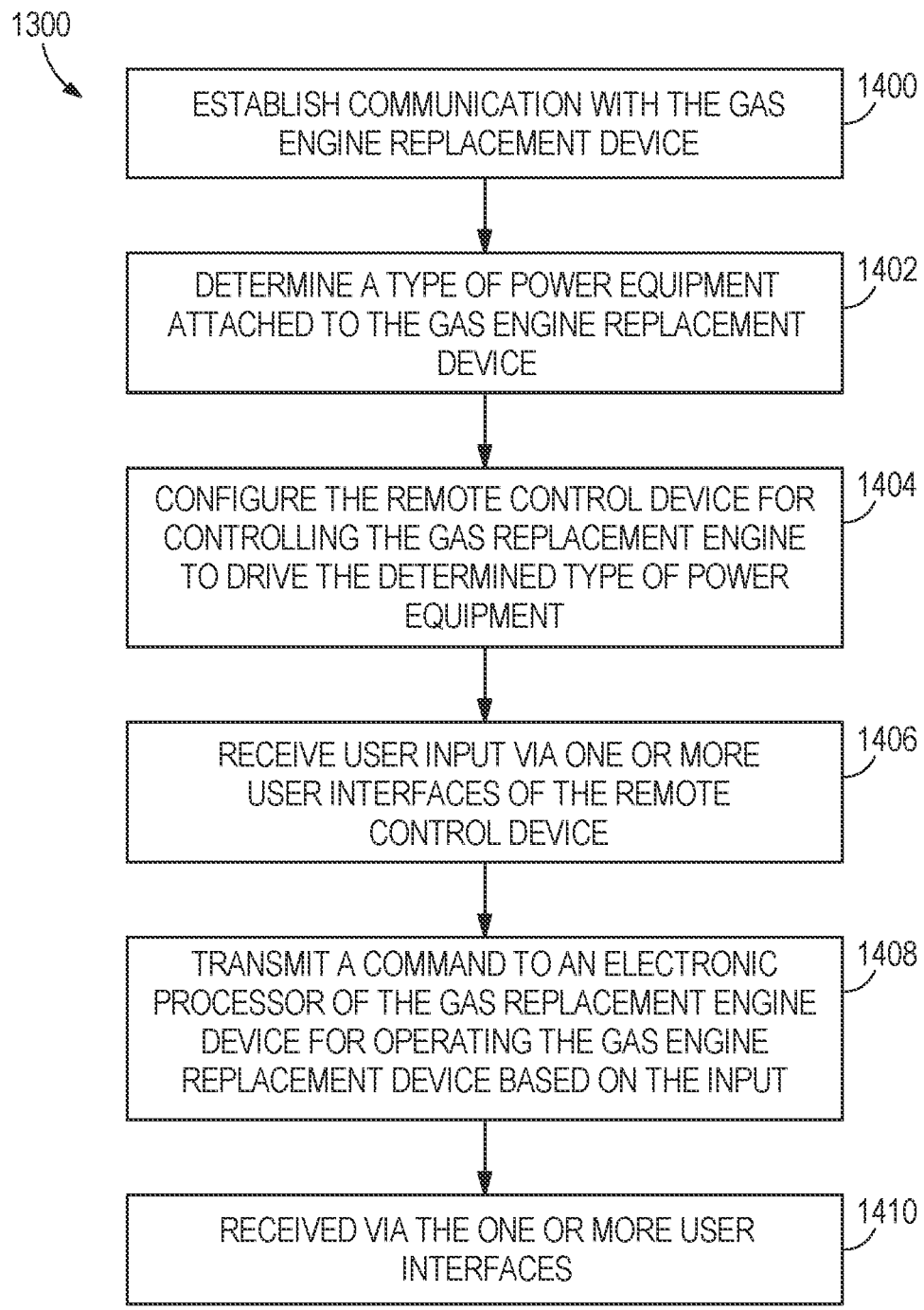
FIG. 14 is a flowchart of a method for controlling a gas engine replacement device of FIG. 1 using a remote control device, according to some embodiments.

FIG. 14 is a flowchart of a method for controlling a gas engine replacement device 10 using the remote control device 150. In step 1400, communication is established between the remote control device 150 and the gas engine replacement device 10. For example, in some embodiments, the remote control 150 and the gas engine replacement device 10 may communicate wirelessly via the wireless transceiver 1020 and the remote interface 152 using Bluetooth protocol and may be configured for discovery and pairing for communication. In some embodiments, user input at the user interface 1018 of the remote control device 150 and/or at the user input device 322 of the gas engine replacement device 10 may initiate the pairing process, which may include a broadcast advertisement message and reply message between the devices. In some embodiments the remote control device may use another communication technology, such as 433 MHz, WiFi, infrared, or cellular and the pairing process may not be necessary.

In step 1402, in some embodiments, the remote control device 150 determines the type of power equipment that is attached to and driven by the gas replacement device 10. For example, the remote control device 150 may receive an identifier or configuration parameters from the gas replacement device 10 that indicates which type of power equipment is to be controlled.

In step 1404, the electronic processor 1010 is configured based on the identifier or configuration parameters received from the gas replacement device 10. The electronic processor 1010 may be configured to control the one or more user interfaces 1018 for use with the specified power equipment based on the identity of the specified power equipment or the parameters for configuring the remote control device 150 received from the gas engine replacement device 10. For example, incremental motor speed control signals may be different depending on which type of power equipment is driven by the gas engine replacement device 10. Additionally, some power equipment may include a motor driven element that is able to rotate only in one direction. Accordingly, the configuration of the remote device 150 may disable a forward-reverse rotation direction selection feature of the remote device 150, such that the permitted rotation direction is not able to be changed by a user. In another example, a gas engine replacement device 10 may not include a worklight or other accessory 154, and the configuration of the remote device 150 disables an accessory control feature of the remote device 150. Of course, in embodiments of the power equipment and gas engine replacement device 10 that include forward and reverse motor rotation capabilities or controllable accessories, as indicated by the information received at block 1402, the remote device 150 is configured in block 1404 to enable control of these features. In other embodiments, the remote control device may be pre-configured, for example, by an OEM, and may not be reconfigurable by an end user.

In step 1406, user input is received via the one or more user interfaces 1018 of the remote control device 150 to control the gas engine replacement device 10. For example, a user may actuate an input component on the remote control device 15. The electronic processor 1010 may determine a control action based on the received input, for example, by retrieving data configured in a look-up table. The look-up table may be associated with the particular type of power equipment or gas engine replacement device 10 with which the remote control device 150 is in communication, and may be selected from among a plurality of look-up tables in the memory 1020 based on the configuration information received in block 1404, for example.

In step 1408, the electronic processor 1010 may transmit a control signal via the wireless interface 1020 or the wire line interface 1022 based on the determined control action to the gas engine replacement device 10 for operating the gas engine replacement device 10. In response to receiving the control signal, the electronic processor 302 of the gas engine replacement system 10 may initiate a command to turn-on the motor 36, turn-off the motor 36, vary a speed of the motor 36, control a direction of rotation of the motor 36 in a forward or reverse direction, or the accessory 154 (e.g., to turn on, turn off, or adjust an operating parameter).

In some embodiments, the remote control device 150 receives a status or state of the gas engine replacement system 10 from the gas engine replacement system 10 via the wireless interface 1020 or the wire line interface 1022. The electronic processor 1010 may transmit a signal to the one or more user interfaces 1018 to indicate the status or state. For example, the one or more user interfaces 1018 may indicate a level of charge of the battery pack 50, time remaining for use of the battery pack 50, a work cycle applied to the motor 36, a speed of the motor 36 or the power take-off shaft 38, torque applied to the motor 36, efficiency of the motor 36, or status of the accessory 154 (e.g., on, off, or value of an operating parameter).

Figure 15:
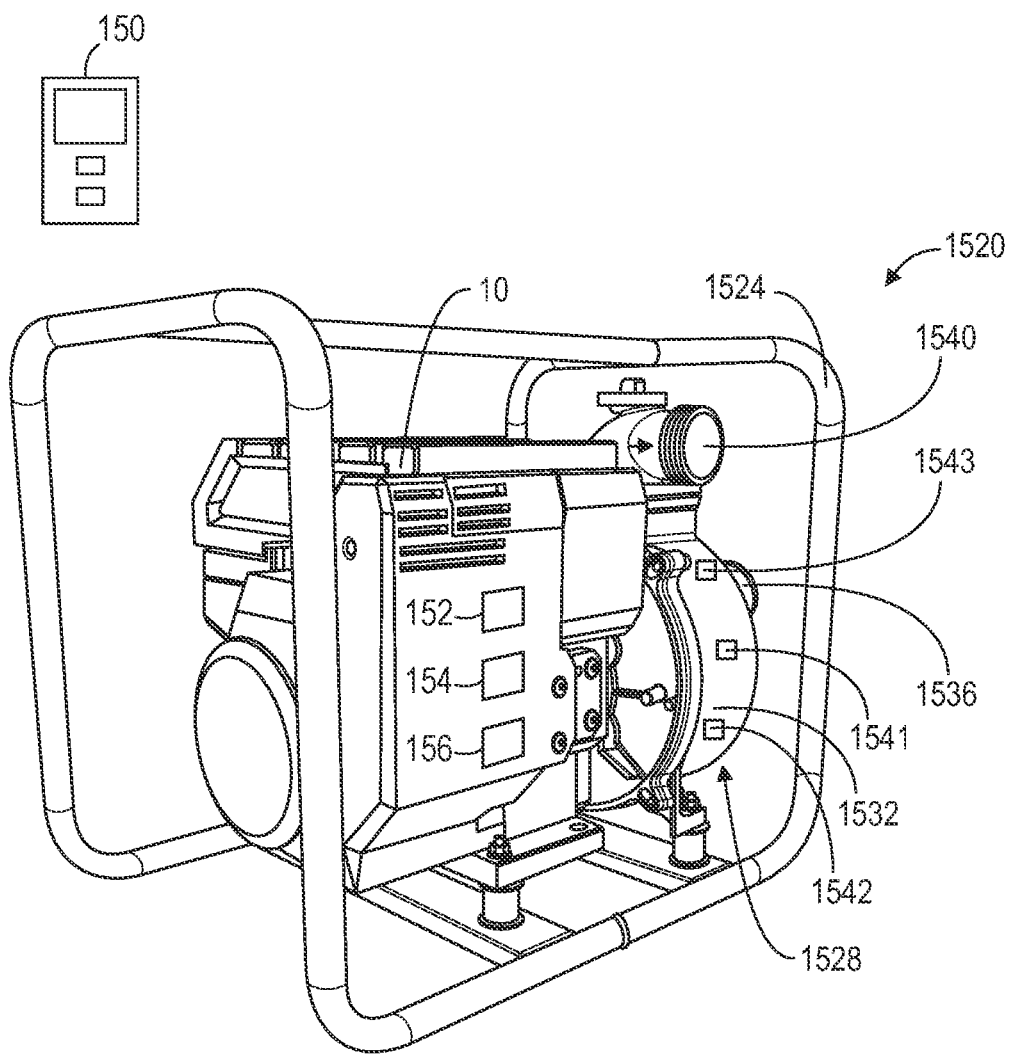
FIG. 15 is a perspective view of a pump system attached to a gas engine replacement device and is controlled by a remote control device, according to some embodiments.

FIG. 15 is a perspective view of a pump system 1520 attached to a gas engine replacement device 10 and is controlled by the remote control device 150. The pump system 1520 includes a frame 1524 supporting the gas engine replacement device 10 and a pump 1528 with the gas engine replacement device 10 operable to drive the pump 1528. The illustrated pump 1528 (i.e., power equipment) is a centrifugal pump having an impeller positioned within a housing 1532 of the pump 1528 that is rotatable about an axis to move material from an inlet 1536 of the pump 1528 to an outlet 1540 of the pump 1528. Specifically, the pump 1528 is a "trash pump" that includes enough clearance between the impeller of the pump 1528 and the housing 1532 (e.g., 8 millimeters) to provide a mixture of a liquid (e.g., water) and debris (e.g., solid material like mud, small rocks, leases, sand, sludge, etc.) to pass through the pump 1528 from the inlet 1536 to the outlet 1540 without the debris getting trapped within the pump 1528 and decreasing the performance of the pump system 1520.

Typically gas engine pumps include only one mode of operation. Particularly, the gas engine may rotate the motor only in one direction, which limits the functionality of the pump. In contrast, the pump system 1520 includes the gas engine replacement device 10 including a motor 36 that can be rotated in both the forward and reverse directions. Accordingly, the pump system 1520 is adapted to perform different functions based on the rotation direction of the motor 36. When the electronic processor 302 rotates the motor 36 in a first direction, the pump 1528 may drive the impeller in a forward direction to move material from an inlet 1536 of the pump 1528 to an outlet 1540 of the pump 1528. When the electronic processor 302 rotates the motor 36 in a second direction (e.g., as in block 420), the pump 1528 may drive the impeller to clear jams or clear the pump 1528 if debris is stuck within the pump 1528 (without utilizing a transmission including a forward gear and a rearward gear). In some embodiments, the motor 36 may controlled by the electronic processor 302 to rotate at slower speed in the second direction than in the first direction to clear jams in the pump 1528. For example, the electronic processor 302 may provide PWM signals to the FETs of the power switching network 310 with a higher duty ratio when driving in the first direction than the duty ratio when driving in the second direction, to rotate the motor 36 at a higher speed in the first direction than in the second direction.

The pump includes sensors 1541 and 1542. The sensor 1541 detects an amount of liquid being moved through the pump 1528. Based on output from the sensor 1541 a signal may be sent to the remote control device 150 for display of an indication of the amount of liquid being moved through the pump 1528 via one or more of the user interfaces 1018. Based on input received via the one or more user interfaces 1018, a signal is transmitted by the electronic processor 1010 to the electronic processor 302 of the gas engine replacement device 10 to enable or disable operation of the pump 1528 (e.g., drive the motor 36). For example, the display 1018 may indicate that the amount of liquid is at or above a threshold level or below a threshold and the user may actuate a user interface 1018 input to stop operation of the pump 1528 if the amount of liquid is below the threshold level. However, in other embodiments, the electronic processor 302 can simply monitor the current drawn by the motor 36 to determine whether to slow down or stop the motor 36.

The sensor 1542 on the pump 1528 is connected to the electronic processor 302 via a power equipment interface (not shown) and is arranged in an impeller reservoir of the pump 1528. The sensor 1542 monitors suction or fluid level in the impeller reservoir. The electronic processor 302 receives output from the sensor 1542 and transmits an indicator signal to the remote control device 150 via the wireless interface 1020 or the wire line interface 1022. In response, the electronic processor 1010 may output a signal to an indicator (e.g., an LED or display device) of the user interface 1018 when output of the sensor 1542 output indicates that the pump 1528 is not adequately primed. In some embodiments, the electronic processor 1010 may receive user input via the one or more user interfaces 1018 and may transmit a signal to the electronic processor 302 of the gas engine replacement device 10 to shut off the pump 1528 to protect the pump system 1520 based on the user input. Alternatively or in addition, based on the user input, the electronic processor 302 may transmit a signal to an electronically controlled valve 1543 on the pump 1528 to adjust an exhaust opening to support an auto-priming capability to protect the pump system 1520.

The gas engine replacement device 10 may be coupled to and drive other types of power equipment such as a compactor, a rammer, a jetter, and a pump system, etc.

We claim:

1. A remotely controllable gas engine replacement device comprising:
   a housing;
   a battery receptacle coupled to the housing, the battery receptacle configured to removably receive a battery pack;
   a motor located within the housing;
   a power take-off shaft receiving torque from the motor and protruding from a side of the housing;
   a power switching network configured to selectively provide power from the battery pack to the motor;
   one or more remote control device interfaces configured to communicate with a remote control device; and
   an electronic processor connected to the power switching network and the remote control device interface, the electronic processor configured to:
   control the power switching network to rotate the motor,
   receive a control signal from the remote control device,
   execute a responsive action to the control signal from the remote control device,
   transmit battery pack information to the remote control device via the one or more remote control device interfaces for indicating in one or more user interfaces of the remote control device, and
   transmit an operating state of the gas engine replacement device to the remote control device via the one or more remote control device interfaces for indicating in the one or more user interfaces of the remote control device.

2. The remotely controllable gas engine replacement device of claim 1, further comprising:
   an electrical interface supported on the housing for providing charge from the battery pack to a battery of the remote control device.

3. The remotely controllable gas engine replacement device of claim 1, further comprising:
a wireless receiver,
wherein the one or more remote control device interfaces configured to communicate with the remote control device includes a wireless interface, and the control signal received by the electronic processor from the remote control device is received via the wireless interface and the wireless receiver.

4. The remotely controllable gas engine replacement device of claim 1, wherein the one or more remote control device interfaces configured to communicate with the remote control device includes a wire line interface configured to receive a cable connected to the remote control device,
wherein the control signal received by the electronic processor from the remote control device is received via the wire line interface and the cable connected to the remote control device.

5. The remotely controllable gas engine replacement device of claim 1, wherein the battery pack information includes at least one of a level of charge of the battery pack and time remaining for use of the battery pack.

6. The remotely controllable gas engine replacement device of claim 1, wherein the electronic processor is further configured to transmit to the remote control device one or both of:
an identity of a specified power equipment attached to and driven by the gas engine replacement device for configuring the remote control device for use with the specified power equipment, and
parameters for configuring the remote control device for use with the specified power equipment.

7. A method for remotely controlling a gas engine replacement device, the method comprising:
controlling, by an electronic processor, a power switching network to rotate a motor, the power switching network configured to selectively provide power from a battery pack to the motor, the battery pack removably received by a battery receptacle coupled to a housing of the gas engine replacement device, the motor providing torque to a power take-off shaft protruding from a side of the housing;
receiving, by the electronic processor, a control signal from the remote control device;
executing, by the electronic processor, a responsive action to the control signal from the remote control device to control the gas engine replacement device;
transmitting battery pack information to the remote control device for indicating in one or more user interfaces of the remote control device; and
transmitting an operating state of the gas engine replacement device to the remote control device via the one or more remote control device interfaces for indicating in the one or more user interfaces of the remote control device.

8. The method of claim 7, further comprising providing, using an electrical interface supported on the housing, charging power from the battery pack to a battery of the remote control device.

9. The method of claim 7, wherein the control signal from the remote control device is received over a wireless interface between the gas engine replacement device and the remote control device.

10. The method of claim 7, wherein the control signal from the remote control device is received over a wire line interface between the gas engine replacement device and the remote control device.

11. The method of claim 7, further comprising receiving a command for controlling a light of the gas engine replacement device.

12. The method of claim 7, wherein the battery information includes at least one of a level of charge of the battery pack, and a time remaining for use of the battery pack, and wherein the operating state includes at least one of a work cycle applied to the motor, a speed of the power take-off shaft, torque applied to the motor, and an efficiency of the motor.

13. The method of claim 7, further comprising transmitting to the remote control device one or both of
transmitting an identity of a specified power equipment attached to and driven by the gas engine replacement device to the remote control device for configuring the remote control device for use with the specified power equipment, and
parameters for configuring the remote control device for use with the specified power equipment.

14. A remote control device for controlling a gas engine replacement device, the gas engine replacement device including a power switching network to selectively provide power from a battery pack to a motor to rotate the motor and provide torque to a power take-off shaft, the remote control device comprising:
a housing;
one or more communication interfaces configured to communicate with the gas engine replacement device;
one or more user interfaces; and
an electronic processor coupled to the one or more communication interfaces and the one or more user interfaces, the electronic processor configured to:
receive input via the one or more user interfaces,
transmit a control signal to the gas engine replacement device via the one or more communication interfaces for execution of a responsive action to the control signal by the gas engine replacement device based on the received input,
transmit battery pack information to the remote control device via the one or more remote control device interfaces for indicating in one or more user interfaces of the remote control device, and
transmit an operating state of the gas engine replacement device to the remote control device via the one or more remote control device interfaces for indicating in the one or more user interfaces of the remote control device.

15. The remote control device of claim 14, wherein the gas engine replacement device further includes:
a device housing;
a battery receptacle supported by the device housing, the battery receptacle configured to removably receive the battery pack; and
one or more electrical interfaces supported by the device housing for receiving power to charge the battery pack, wherein the power is received from the gas engine replacement device or from a separate power source.

16. The remote control device of claim 14, wherein:
the one or more communication interfaces configured to communicate with the gas engine replacement device includes a wireless interface, and
the control signal transmitted to the gas engine replacement device via the one or more communication interfaces for execution of a responsive action to the control signal by the gas engine replacement device is transmitted via the wireless interface.

17. The remote control device of claim 14, wherein:
the one or more communication interfaces configured to communicate with the gas engine replacement device includes a wire line interface configured to receive a cable connected to the gas engine replacement device, and the control signal transmitted to the gas engine replacement device via the one or more communication interfaces for execution of a responsive action to the control signal by the gas engine replacement device is transmitted via the wire line interface and the cable.

18. The remotely controllable gas engine replacement device of claim 1, wherein the battery pack has a voltage in the range of about 80 volts (V) to 120V.

19. The method of claim 7, wherein the battery pack has a voltage in the range of about 80V to 120V.

20. The remote control device of claim 14, wherein the battery pack has a voltage in the range of about 80V to 120V.

\* \* \* \* \*